United States Patent [19]

Sato

[11] Patent Number: 5,687,559
[45] Date of Patent: Nov. 18, 1997

[54] HYDROGEN-COMBUSTION GAS TURBINE PLANT

[75] Inventor: Iwataro Sato, Tokyo, Japan

[73] Assignee: Kabushiki Kaisha Toshiba, Kanagawa-ken, Japan

[21] Appl. No.: 601,323

[22] Filed: Feb. 16, 1996

[30] Foreign Application Priority Data

Feb. 20, 1995 [JP] Japan .................................. 7-030727

[51] Int. Cl.$^6$ ................................. F02C 6/00; F02C 1/06
[52] U.S. Cl. .................. 60/39.182; 60/39.17; 60/39.181
[58] Field of Search ........................... 60/39.15, 39.161, 60/39.17, 39.55, 39.181, 39.182, 39.465

[56] References Cited

U.S. PATENT DOCUMENTS

| | | | |
|---|---|---|---|
| 2,717,491 | 9/1955 | Barr | 60/39.182 |
| 4,166,362 | 9/1979 | Laurent | 60/39.181 |
| 5,267,288 | 11/1993 | Frutschi et al | 60/39.181 |

FOREIGN PATENT DOCUMENTS

| | | | |
|---|---|---|---|
| 6123238 | 5/1994 | Japan | 60/39.465 |
| 6-299805 | 10/1994 | Japan . | |

OTHER PUBLICATIONS

W. Peschka, Hydrogen Combustion in Tomorrow's Energy Technology, Int. J. Hydrogen Energy, vol. 12, No. 7, (1987), pp. 1019–1036.

S. Kan et al., Reheat Gas Turbine with Hydrogen Combustion Between Blade Rows, 1983 Tokyo International Gas Turbine Congress, pp. 205–212.

K. Hiraoka et al., Thermodynamic Performance of an Internal Reheat Gas Turbine (IRGT) with Hydrogen Combustion, Report of Ship Research Institute vol. 24, No. 3, (1987), pp. 219–238.

Jericha et al., "Towards a Solar–Hydrogen System", ASME COGEN–TURBO, IGTI–vol. 6, (1991).

*Primary Examiner*—Charles G. Freay
*Attorney, Agent, or Firm*—Finnegan, Henderson, Farabow, Garrett & Dunner, L.L.P.

[57] ABSTRACT

A hydrogen-combustion gas turbine plant includes a first system for using inert gas as a working fluid, and a second system for using steam as a working fluid. The first system includes a compressor on a turbine shaft, a first heat exchanger, and a second heat exchanger. The first heat exchanger heats gas compressed by the compressor and supplies the compressed gas to a high pressure intake of a second turbine. The second heat exchanger cools gas exhausted from the second turbine and supplies the cooled gas to a low pressure intake of the compressor. The second system includes the first heat exchanger and the second heat exchanger. The first heat exchanger uses heat generated by combustion of a gas mixture including hydrogen and oxygen to heat the inert gas, and supplies steam resulting from the combustion to a high pressure intake of a first turbine. The second heat exchanger uses heat from the inert gas of the first system to heat steam exhausted from a low temperature outlet of the first turbine, and passes the heated steam to a third turbine.

6 Claims, 4 Drawing Sheets

∽ CONVENTIONAL ∽

~CONVENTIONAL~

HYDROGEN-COMBUSTION GAS TURBINE PLANT

BACKGROUND OF THE INVENTION

1. Field of the Invention

This invention relates generally to a gas turbine plant and, more particularly, to a gas turbine plant in which its gas turbine combustor is fed hydrogen as fuel.

2. Description of the Related Art

Conventionally, a hydrogen-combustion gas turbine plant has a clean energetic source, for non-exhausting carbonic acid gas ($CO_2$), as distinguished from a plant using fossil fuel which causes green house problems. When hydrogen turns into inert steam after burning, the steam or other inert gas is available as a working fluid for a thermal closed cycle gas turbine plant without encountering oxidation at high temperature. In other words, conventional thermal open cycle gas turbine plants, feeding fossil fuel for their gas turbines, encounter problems in their parts for use with hot gas, which parts pass the fluid oxidized in the high temperature generated during burning of the fuel, or oxygen in the fluid.

When more parts of the turbine, especially those having contact with the fluid, become hotter, the likelihood of oxidation increases. Therefore, these parts must be cooled. As is known in the art, when the coolant of the plant increases, the thermal efficiency of the plant decreases. In addition, cooling these parts with coolant in the plant has been studied, as the temperature of fluid gets higher.

Rising the maximum temperature of the turbine to increase the thermal efficiency of the plant has been noticed, and with this technical development, maximum temperature of the plant has recently ascended rapidly. But nowadays, the maximum temperature has been growing to a peak while increase of the efficiency caused by rising of the temperature has been inferior to that of decrease caused by expanding of the fluid for cooling the plant.

A plant having a gas turbine combustor fed hydrogen is interesting for other reasons. To wit, hydrogen, unlike fossil fuel, may be generated everywhere if there is electric power. That is to say, some countries, having enormous potential resources like water without industrial or consumer demand, are capable of generating the hydrogen as an energy source and exporting the hydrogen.

As described above, the plant fed hydrogen is interesting and research for generation, transportation, and storage of hydrogen has been executed.

One of these types of remarkable gas turbine plants, fed hydrogen as fuel for its gas turbines, is shown in FIG. 6. FIG. 6 shows a systematic diagram of the conventional gas turbine plant fed hydrogen as fuel.

The plant has a generator 6 which is connectable electrically to a power system through its output lines and driven by following turbines. A 1st turbine 4 is mechanically coupled to a turbine shaft 14a that is connectable to a rotor shaft 14b. A compressor 1 is mechanically coupled to the turbine shaft 14a. A 2nd turbine 2 is mechanically coupled to the turbine shaft 14a, and a 3rd turbine 3 is also coupled to the turbine shaft 14a. The plant has a combustor 5, a condenser 9, a 1st heat exchanger 7, a 2nd heat exchanger 8, a 1st pump 10, and a 2nd pump 11, and all these mechanic elements are mechanically coupled to the turbine shaft 14a or thermally connected through plural passages which flow only steam or water as working fluid, as shown in FIG. 6. In addition, the turbine shaft 14a is mechanically connectable with the rotor shaft 14b as a coupled shaft 14.

The plant is generally divided into two parts.

One is a first system, which uses only the steam. The first system has the compressor 1, the combustor 5, and the 2nd turbine 2 thermally functioning in a Brayton cycle, and is a closed cycle system.

In the system, the steam, compressed by the compressor 1, is supplied to combustor 5, and heated after burning of a mixed gas fuel 13 consisting of hydrogen and oxygen. The steam, being high-temperature and high-pressure, is supplied to the 2nd turbine 2 and expands as it drives the shaft 14 to which the compressor 1 and the generator 6 are coupled through the turbine shaft 14a and the rotor shaft 14b, and thus electricity is generated by the generator 6. The steam exhausted from the 2nd turbine 2 leads to the compressor 1 and turns into low-temperature and low-pressure, after passing through the 1st heat exchanger 7 and the 2nd heat exchanger 8.

The other part of the plant is a second system. The second system has the 1st turbine 4, the combustor 5, the 2nd turbine 2, the 1st heat exchanger 7, the 3rd turbine 3, the condenser 9, the 1st pump 10, and the 2nd pump 11, thermally functioning in a Rankine cycle which flows steam or water.

Initially, water pressurized by the 2nd pump 11 and then heated via heat exchange at the 2nd heat exchanger 8 or the 1st heat exchanger 7, turns into high-temperature steam and is led to the 1st turbine 4 to be used as working fluid for the plant. In other words, the water is led to these heat exchangers and is heated by heat exchange with hot gas exhausted from the 2nd turbine 2, and turns into high-pressure, high-temperature steam. Then the steam is supplied to the 2nd turbine 2 through the combustor 5. The steam expands as it drives the turbine shaft 14a, and is led to the 1st heat exchanger 7. At the 1st heat exchanger 7, the steam is cooled by heat exchange with the water exhausted from the 2nd pump 11 through the 2nd heat exchanger 8, and then is led to the 3rd turbine 3. The steam expands as it drives the turbine shaft 14a, and is supplied to the condenser 9 where the steam is cooled, and turns into water. Some of the water condensed at the condenser 9 is pumped by the 1st pump 1D or the 2nd pump 11, and supplied to the 2nd heat exchanger 8 for recycling. The remainder is pumped by the 1st pump 10 and exhausted out of the second system through drain 12.

A quantity of water exhausted through the drain 12 is equal to that resulting from the combustion of the hydrogen and oxygen fuel 13 at the combustor 5.

While generating hydrogen is more expensive than refining crude petroleum, the maximum temperature of a plant having gas turbines fed hydrogen fuel must be higher than that of a plant having gas turbines fed fossil fuel. So a radical countermeasure for oxidization in hot temperature at these turbines is needed, and what can be seen in FIG. 6 is a conventional solution to the problem by using the steam, being inert gas, for working fluid in the plant.

The steam running through passages in the plant has a significantly higher specific heat than burnt gas generated in conventional gas turbine plants in which gas turbines are fed fossil fuel. Therefore, a number of stages in these turbines driven by the steam are needed especially for cooling.

Increasing the number of stages causes a decrease of efficiency of the plant as is known in the art, and after adopting stages fewer stages have been used in the gas turbine. Cooling steps of steam-driven gas turbine plants require twice as many stages as that of the conventional ones, and that causes loss of thermal efficiency. So an improvement of thermal efficiency at high-temperature comes offset with the loss.

The steam, flowing in a cycle of the plant at high-temperature, sometime causes corrosion in passages of the plant, and makes the passages fatigue. Therefore, the conventional plant is unreliable after long time use, and these problems have not been solved.

A conventional approach to the problem is shown in FIG. 7.

Working fluid, running through passages shown in a plant system of FIG. 7, is substantially inert gas. In the inert gas, there may be steam or water, fed oxygen and hydrogen as fuel after burning.

First, the inert gas is compressed by a compressor 1, supplied to a regenerative heat exchanger 15 where it is heated, and supplied to a combustor 5. Then the gas becomes a mixed gas after it is fed with hydrogen and oxygen as fuel 13, being extremely high-pressure and high-temperature. This mixed gas is led to a 2nd turbine 2, where the mixed gas expands and becomes low-pressure, high-temperature, mixed gas while driving the compressor 1 through a shaft 14 coupled to the 2nd turbine 2, and generating electricity at a generator 6 also coupled to the shaft 14.

The gas exhausted from the 2nd turbine 2 is led to the regenerative heat exchanger 15 and cooled by heat exchange with gas supplied to the combustor 5. The gas is cooled at a heat recovery steam generator (HRSG) 16 by heat exchange and, becomes cooled, low-pressure-mixed gas. This cooled low-pressure mixed gas including steam is led to condenser 9 for condensing and cooling below dew point of the steam. Then all the steam in the inert gas turns into water and is exhausted from the thermal system through drain 12. The inert gas is then supplied to the compressor 1 again.

At the HRSG 16, steam produced from thermal increase of the mixed gas, generates electrical power by driving a steam turbine (not shown) connected to the generator 6 or another means.

In this plant, the inert gas used as working fluid has a specific heat nearly equal to conventional burnt gas. Yet using the inert gas like argon or nitrogen requires a nearly equal number of stages for cooling in a gas turbine, such as 2nd turbine 2, so it does not have the problems associated with increasing the number of stages for the system shown in FIG. 6. The inert gas includes less steam than that of the thermal cycle described in connection with FIG. 6, so the problem of corrosion of steam is solved somewhat.

Only some of the working fluid circulating through the thermal system described in FIG. 6 exchanges its heat at the condenser 9, but all the working fluid circulating through the thermal system described in FIG. 7 exchanges its heat at the condenser 9, and all the steam generated at the HRSG 16 is terminally supplied to a condenser (not shown) and heat exchanges with outside refrigerant.

Since the thermal system described in FIGS. 6 or 7 is fundamentally a closed cycle, thermal capacity exhausted from these systems is only from the condenser 9. The less the thermal capacity exhausted from the condenser 9, the more the quantity of heat increases. Consequently, the quantity of heat of the system described in FIG. 7 is offset by increasing of the number of stages for cooling.

As described above, running steam or water for the working fluid through mechanical elements in a conventional hydrogen-combustion gas turbine plant which includes a combustor fed hydrogen as fuel has problems. As the number of cooling stages increases, the quantity of heat decreases. And as the stages increase, the plant is less likely to operate safely over a long time because of corrosion caused by steam.

When using the inert gas for working fluid, all the fluid ought to be conducted to condenser 9, and the quantity of heat of the plant decreases by increasing exhaustion of thermal capacity from the thermal system.

Accordingly, a primary object of this invention is to provide a hydrogen-combustion gas turbine plant for solving the problem of steam corrosion without increasing the number of cooling stages. Yet another object is to increase the quantity of heat of the plant by supplying a portion of the working fluid to a condenser.

SUMMARY OF THE INVENTION

While the invention is particularly shown and described with reference to preferred embodiments thereof, it will be understood by those skilled in the art that changes in form and details can be made without departing from the spirit and scope of the invention.

Many other features, advantages and additional objects of the present invention will become manifest to those versed in the art upon making reference to the detailed description which follows and the accompanying sheets of drawings.

In accordance with one aspect of the invention, a hydrogen-combustion gas turbine plant includes a first system for using inert gas as a working fluid, the first system including a compressor on the turbine shaft, a 1st heat exchanger, and a 2nd heat exchanger, the 1st heat exchanger heating gas compressed by the compressor and supplying the compressed gas to the high pressure intake of the 2nd turbine, the 2nd heat exchanger cooling gas exhausted from the 2rd turbine and supplying the cooled gas to a low pressure intake of the compressor; and a second system for using steam as a working fluid, the second system including the 1st heat exchanger and the 2nd heat exchanger, the 1st heat exchanger using heat generated by combustion of a gas mixture including hydrogen and oxygen to heat the inert gas, the 1st heat exchanger supplying steam resulting from the combustion to a high pressure intake of the 1st turbine, the 2nd heat exchanger using heat from said inert gas of said first system to heat steam exhausted from a low temperature outlet of the 1st turbine, the 2nd heat exchanger passing the heated steam to the 3rd turbine.

DESCRIPTION OF THE PREFERRED EMBODIMENT

Preferred embodiments of the present invention will be described below with reference to the accompanying drawings.

Figure 1:
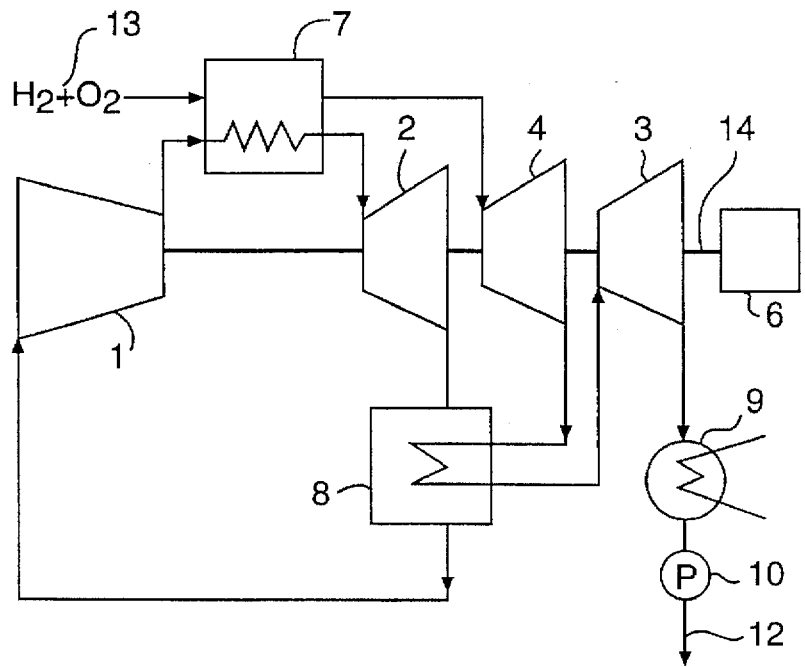
FIG. 1 is a systematic diagram showing a hydrogen-combustion gas turbine plant according to a first embodiment of the present invention.

Referring now to the drawings and particularly to FIG. 1, which is a systematic diagram showing a hydrogen-combustion gas turbine plant according to a first embodiment of the present invention, the invention is shown generally in this figure, however, this invention is not limited to such an annular configuration and may be employed with equal effectiveness in hydrogen-combustion gas turbine plants of the well-known inert gas running system type.

The hydrogen-combustion gas turbine plant shown in FIG. 1 consists of two of parts.

One part is a first system thermally behaving in a Brayton cycle and comprises a compressor 1, a 1st heat exchanger 7, a 2nd turbine 2, a 2nd heat exchanger 8, and a passage connecting these components, as shown in FIG. 1. The first system runs working fluid of inert gas, for instance argon or nitrogen.

The other part of the plant is a second system which thermally behaves in a Rankine cycle and comprises the 1st heat exchanger 7, a 1st turbine 4, the 2nd heat exchanger 8, a 3rd turbine 3, a condenser 9, a 1st pump 10, and a passage connecting these components, as shown in FIG. 1. The second system runs steam or water as a working fluid.

In other words, the working fluid of this invention comprises only the inert gas fluid in the first system and only the steam in the second system. During heat exchange at the 1st heat exchanger 7 or the 2nd heat exchanger 8, they are never mixed with each other.

A high-temperature heat source for the first system is caused by burning of hydrogen and oxygen at the 1st heat exchanger 7, and a low-temperature heat source of the system is caused by exhausting heat of the second system by heat exchange at the 2nd heat exchanger 8.

In the first system, the inert gas compressed by compressor 1 is led to the 1st heat exchanger 7, heated, and becomes high-pressure, extremely high-temperature, inert gas. This high-pressure, extremely high-temperature, inert gas is led to the 2nd turbine 2 and becomes low-pressure, high-temperature, inert gas by expansion, and also generates electric power by driving the compressor 1 coupled to a turbine shaft 14a and a generator 6 coupled to a rotor shaft 14b through a shaft 14. The low-pressure, high-temperature, inert gas exhausted from the 2nd turbine 2 is led to the 2nd heat exchanger 8, becomes low-pressure, low-temperature, inert gas by cooling, and is then led to the compressor 1 again.

In the second system, fuel 13, such as hydrogen and oxygen at a high pressure, burns in the 1st heat exchanger 7 and becomes high-pressure, high temperature steam supplying heat to the first system. This high-pressure, high-temperature steam expands at the 1st turbine 4 and becomes low-pressure, low-temperature steam while driving the shaft 14. This low-pressure, low-temperature steam is led to the 2nd heat exchanger 8 and becomes low-pressure, high-temperature steam from heat supplied by the first system. This low-pressure, high-temperature steam is led to the 3rd turbine 3, expands, and becomes extremely low-pressure, low-temperature steam while driving the shaft 14. This extremely low-pressure, low-temperature steam is led to the condenser 9 and becomes hot water by cooling. Then the water is exhausted out of the plant from drain 12 by a 1st pump 10.

In the manner as stated above, the thermal maximum point is at an intake of the 2nd turbine 2, except in the 1st heat exchanger 7 where burning of the mixed gas takes place. Decreasing thermal efficiency of the plant is prevented because the number of cooling stages for running the inert gas as working fluid in the system is not increased.

Figure 6:
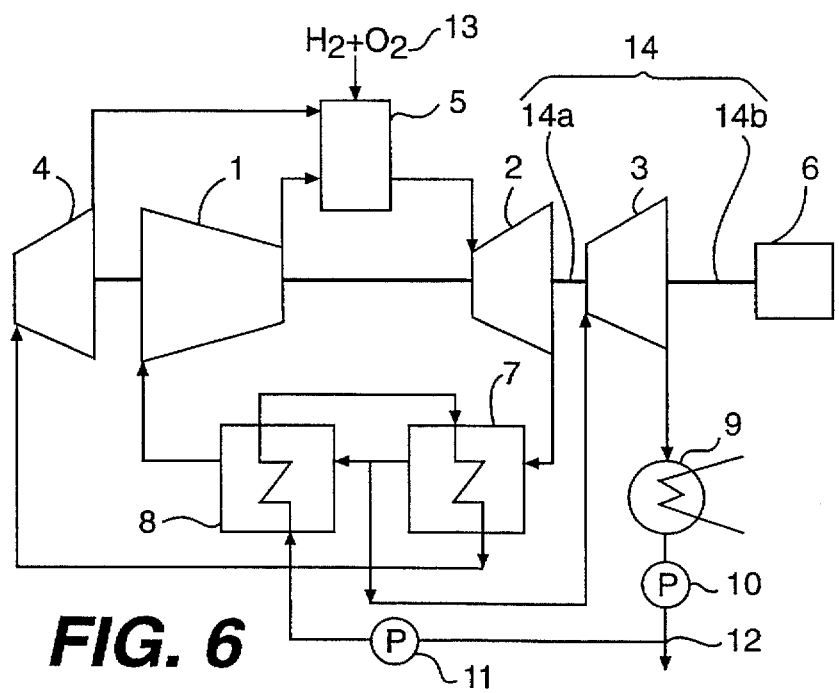
FIG. 6 is a systematic diagram showing a hydrogen-combustion gas turbine plant according to a conventional approach.
Figure 7:
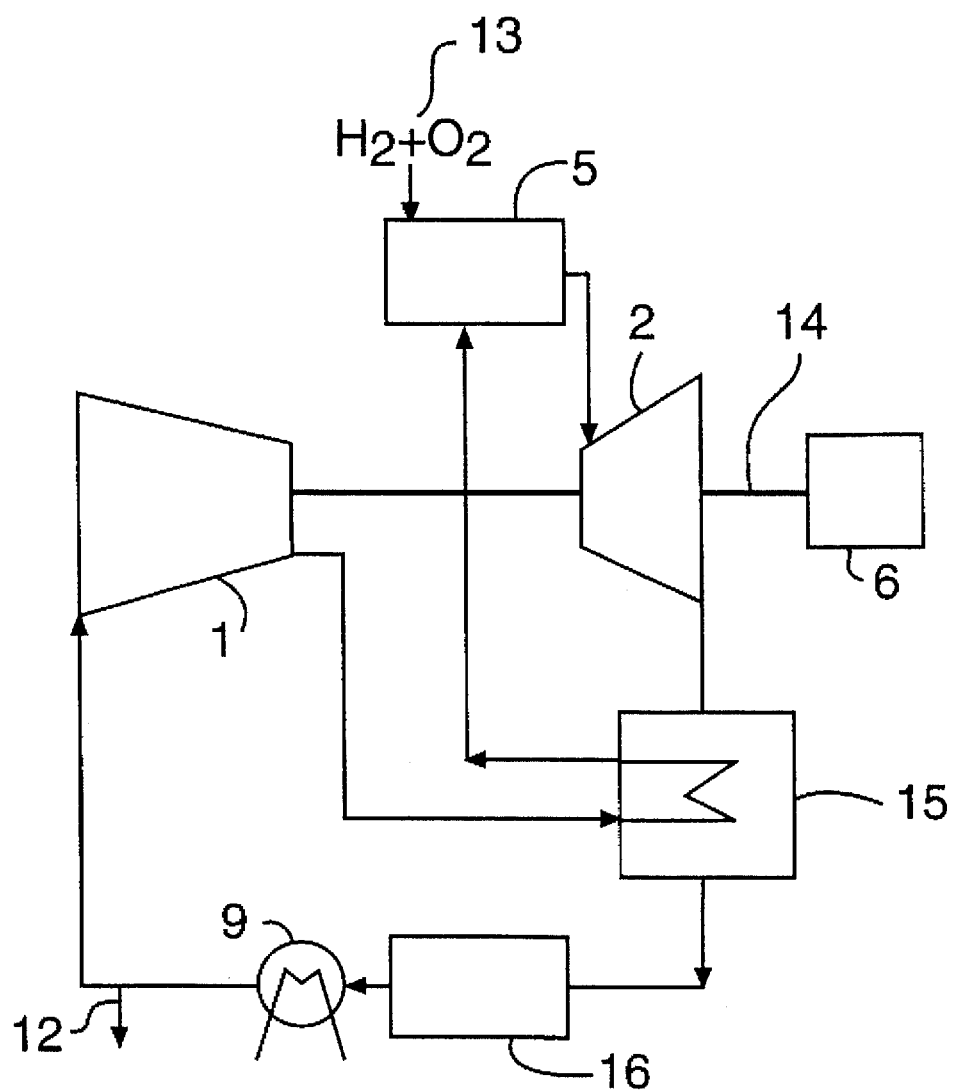
FIG. 7 is a systematic diagram showing a hydrogen-combustion gas turbine plant according to another conventional approach.

A ratio of the working fluid led to the condenser 9 to a sum of running working fluid is small, and the thermal efficiency of the plant remains because heat of working fluid is not exhausted out of the system through the condenser 9. Therefore, the plant of present invention can increase the thermal efficiency of the plant more than conventional plants shown in FIGS. 6 or 7.

In addition, decreasing reliability caused by steam corrosion after long time use of the plant is effectively avoided because the maximum temperature point of the plant is in the first system running the inert gas.

Figure 2:
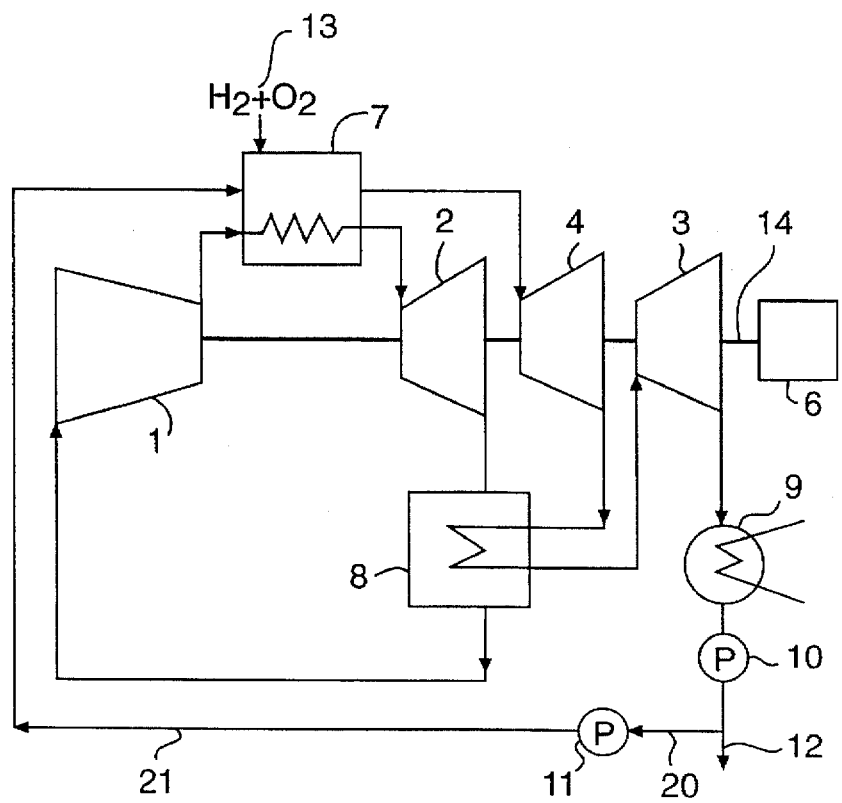
FIG. 2 is a systematic diagram showing a hydrogen-combustion gas turbine plant according to a second embodiment of the present invention.

A hydrogen-combustion gas turbine plant according to a second embodiment of the present invention will now be described with reference to FIG. 2. The same reference numerals as used in FIG. 1 are also used in FIG. 2 for corresponding or identical elements to avoid repeating their descriptions, and only the difference between the first and second embodiments will be discussed below.

According to the second embodiment, the hydrogen-combustion gas turbine plant has a branch passage 20 from an outlet of the 1st pump 10 to drain 12 in the second system of the above mentioned first embodiment.

The second embodiment of the hydrogen-combustion gas turbine plant can make the water as the working fluid of the plant branch off through the branch passage 20 and lead to a low temperature side of the 1st heat exchanger 7 after it is pressurized by a 2nd pump 11.

The water led to the 1st heat exchanger 7 is heated by combustion of hydrogen and the oxygen supplied to the 1st heat exchanger 7 as fuel 13. Then the water becomes high-pressure, high-temperature steam and supplies heat to the first system that thermally behaves in a Brayton cycle at the 2nd heat exchanger 8.

A thermal efficiency of the hydrogen-combustion gas turbine plant is only governed by pressure or temperature, especially a quantity of heat caused by heat exchange between the first system and the second system at the 1st heat exchanger 7 or the 2nd heat exchanger 8 for each machine of the plant. Therefore, the best mode for operating of the plant might not be achieved by selecting the first embodiment. The second embodiment of the plant has the branch passage 20 branching off from the 1st pump 10 and coupling to a lower pressure intake of the 2nd pump 11 and a channel 21 between the 2nd pump 11 and the 1st heat exchanger 7. The plant of second embodiment can govern a ratio of quantity of heat between the first system and the second system by controlling the running fluid in the branch passage 20 and the channel 21. Therefore, the plant can be appropriately operated at the best mode, which is the maximum point of the thermal efficiency of the plant.

Figure 3:
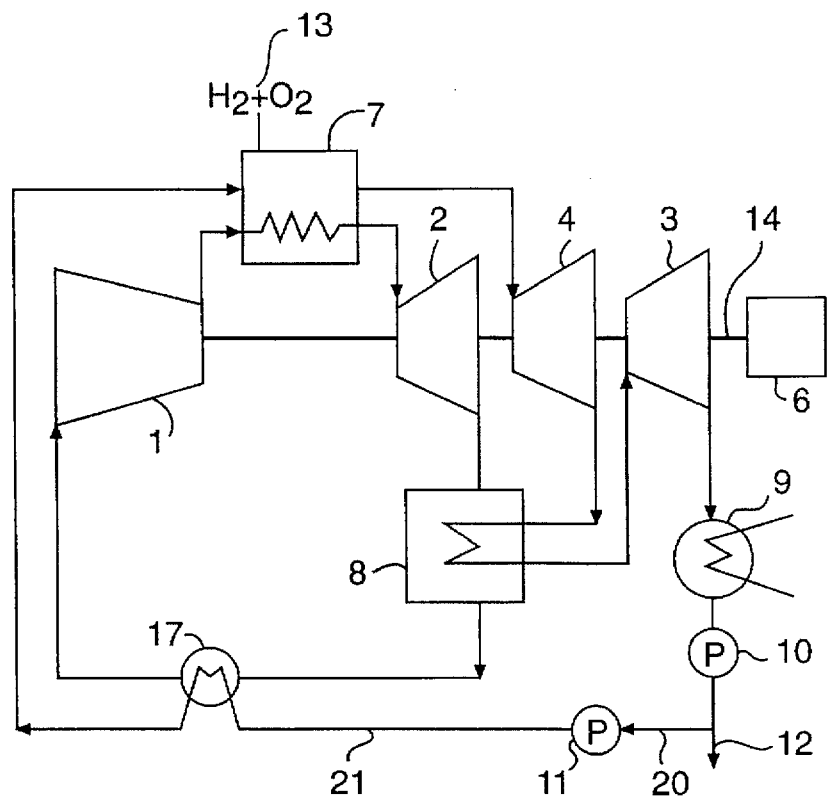
FIG. 3 is a systematic diagram showing a hydrogen-combustion gas turbine plant according to a third embodiment of the present invention.

A hydrogen-combustion gas turbine plant according to a third embodiment of the present invention will now be described with reference to FIG. 3. FIG. 3 shows the third embodiment of the present invention for the hydrogen-combustion gas turbine plant.

The plant of this embodiment has a cooler 17 in the first system between a low temperature side of the 2nd heat exchanger 8 and a low pressure side of the compressor 1. In the second system, the plant has the cooler 17 between a high-pressure side of the 2nd pump 11 and a low temperature side of the 1st heat exchanger 7 added to the plant of the second embodiment. The water running through the channel 21 is pumped by the 2nd pump 11 and used for coolant in the cooler 17 of the first system.

Since the plant of this embodiment has the cooler 17 in the first system, the working fluid, inert gas exhausted from the 2nd heat exchanger 8, is cooled by heat exchange with the coolant. Then the gas cooled at the cooler 17 becomes low-temperature, low-pressure inert gas, and is led to a low pressure side of the compressor 1.

On the other hand, in the second system, the water pressured by the 2nd pump 11 is heated at the cooler 17 by heat exchange with the gas exhausted from the 2nd heat exchanger 8, turns into hot water, and is led to the 1st heat exchanger 7.

The temperature at an intake of the compressor 1 is nearly the temperature at an outlet of the 1st turbine 4 in the second embodiment. In the first system, the gas exhausted from the 2nd turbine 2 is led to the low pressure side of the compressor 1 after running through the 2nd heat exchanger 8. When the gas exhausted from the 2nd turbine 2 flows through the 2nd heat exchanger 8, the gas exchanges heat with steam which is exhausted from the 1st turbine 4, and is not hotter than the gas. This is because the temperature at the intake of the compressor 1 is nearly the temperature at the outlet of the 1st turbine 4 in the second embodiment. So, the plant described in the second embodiment has the problem of preventing increases of total power of the plant, which is caused by not gaining heat drop of 1st turbine 4 in the first system.

When solving the problem by increasing the heat drop of the first system, another problem occurs. To wit, increasing the heat drop of the first system is especially necessary to decrease temperature of the steam exhausted from the 1st turbine 4 by means of increasing heat consumption at the turbine in the second system.

But using the means for solving the problem, the steam led to the 1st turbine 4 would include water caused by condensation. Consequently, mixed fluid including the steam and the water is supplied to moving blades of the 1st turbine 4, which is turning at high speed around the shaft 14. If the mixed fluid includes the water, the water is also led to the blades of the turbine, and the blades can be damaged by the water.

That is why decreasing temperature of the steam exhausted from the 1st turbine 4 is so difficult to increase the heat drop of the first system.

By the way, since decreasing the temperature at the intake of the compressor 1 is almost impossible, the temperature is higher than that of a conventional plant fed fossil fuel for its gas turbine.

Generally speaking, the more the temperature of working fluid at an intake point for a gas turbine rises, the more power of the gas turbine decreases. So the power of the gas turbine used for the plant of second embodiment is inferior to that of the gas turbine used for the conventional one fed fossil fuel.

Using the plant of the third embodiment, where the cooler 17 decreases temperature of a low pressure side of the compressor 1, the power of the plant rises as high as conventional ones. In addition, the moving blades may not be destroyed.

Since the heat source for cooling of the cooler 17 is the water, and since partial drain 12 branched off from the branch passage 20 at a high pressure side of the 1st pump 10, or the heat source for heating of the cooler 17 is thoroughly used among the machines of the plant, the plant never loses quantity of heat from the plant. Therefore, heat efficiency of the plant should recover or increase rather than decreasing during generation of the power by the plant.

In another variation of this embodiment, evaporation heat from the mixed gas, such as hydrogen or the oxygen which is fed to the 1st heat exchanger 7 as fuel, may be used for the heat source for cooling of coolant in the cooler 17.

In addition, when using the evaporation heat for heat source for cooling in the condenser 9, the plant loses no quantity of heat out of the plant, and the heat efficiency of the plant may increase substantially.

Figure 4:
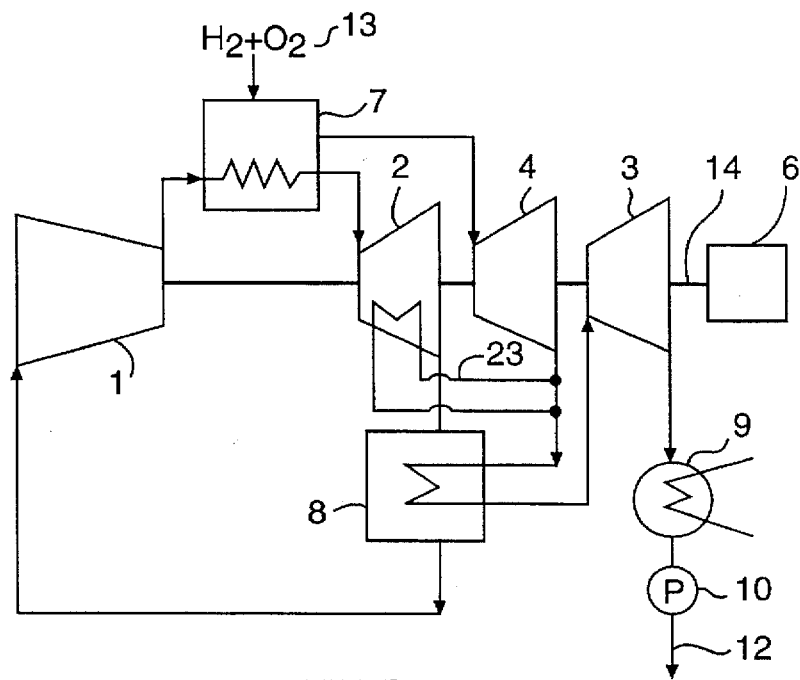
FIG. 4 is a systematic diagram showing a hydrogen-combustion gas turbine plant according to a fourth embodiment of the present invention.

A hydrogen-combustion gas turbine plant according to a fourth embodiment of the present invention will now be described with reference to FIG. 4. FIG. 4 shows the fourth embodiment of the present invention for the hydrogen-combustion gas turbine plant.

This embodiment of the plant has a means for branching 23 added to the plant of the first embodiment. The means for branching 23 is branched off from an outlet of the 1st turbine 4 and leads partial steam exhausted from the turbine to hot parts (ex. fixed blades) mounted in the 2nd turbine 2 without mixing with the inert gas as working fluid of the 2nd turbine 2. The means for branching 23 also leads the steam to the 2nd heat exchanger 8 where it flows together with steam not supplied to the 2nd turbine 2.

In other words, part of the steam exhausted from the 1st turbine 4 is branched off to the means for branching 23, is led to the fixed blades mounted in the 2nd turbine 2 without mixing with the inert gas, is supplied with heat from the inert gas from heat exchange with the inert gas, is flowed together non-supplied steam to the 2nd turbine 2, and is led to the 2nd heat exchanger 8 through the means for branching 23.

In addition, the mixing of the steam as coolant with the inert gas in the 2nd turbine 2 at the fixed blades causes pressure loss for the inert gas in the first system, which may decrease adiabatic efficiency of the 2nd turbine 2, and which may also cause decreasing thermal efficiency of the plant.

Having the means for branching 23 in the plant according to the fourth embodiment, causes no decreasing of pressure loss for the inert gas in the first system, and may increase the thermal efficiency of the plant to a level greater than that of conventional plants.

Figure 5:
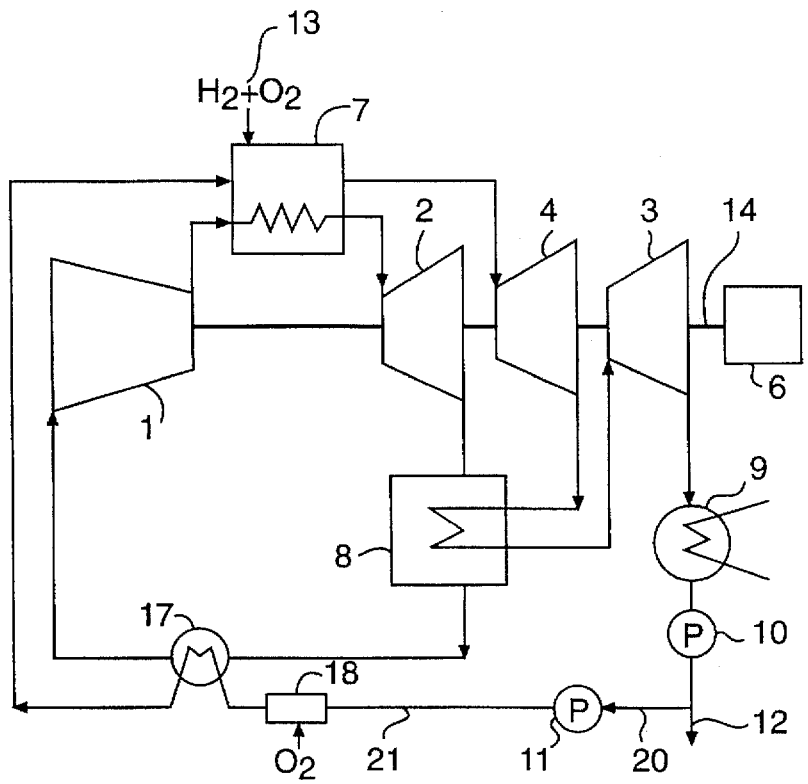
FIG. 5 is a systematic diagram showing a hydrogen-combustion gas turbine plant according to a fifth embodiment of the present invention.

A hydrogen-combustion gas turbine plant according to a fifth embodiment of the present invention will now be described with reference to FIG. 5. FIG. 5 shows the fifth embodiment of the present invention for the hydrogen-combustion gas turbine plant.

This embodiment of the plant has an oxygen dissolver 18, which dissolves or atomizes oxygen in the water pumped by the 2nd pump 11 in the second system, and which is added to the plant of the third embodiment. The oxygen dissolver 18 is positioned between a high pressure side of the 2nd pump 11 and a low temperature side of the cooler 17. The oxygen dissolved by the oxygen dissolver 18 is enclosed by the water pumped by the 2nd pump 11 through the channel 21. The oxygen enclosed in the water chemically combines with impurities, which are present in the water. Because the impurities are chemically combined with the oxygen, they may not stick and form scale. The oxygen chemically combined with the impurities is led to the 1st heat exchanger 7 and is burnt with hydrogen fed as fuel, so that it turns into steam as working fluid of the second system.

As described above, the plant of fifth embodiment shall prevent increase of pressure loss in the plant by preventing sticking of the scale inside the channel 21. In addition, the plant may prevent oxidation at high temperature among machines of the plant.

What is claimed is:

1. A hydrogen-combustion gas turbine plant including an electrical power generator having a rotor shaft, a first turbine on a turbine shaft coupled to the rotor shaft, a second turbine on said turbine shaft, a third turbine on said turbine shaft, and a condenser connected to an outlet of said third turbine, said third turbine outputting steam and said condenser condensing the steam output from said third turbine, said plant comprising:

(a) a first system for using inert gas as a working fluid, the first system including a compressor on said turbine shaft, a first heat exchanger, and a second heat exchanger, the first heat exchanger heating gas compressed by said compressor and supplying said compressed gas to a high pressure intake of said second turbine, the second heat exchanger cooling gas exhausted from said second turbine and supplying the cooled gas to a low pressure intake of said compressor; and (b) a second system for using steam as a working fluid, the second system including said first heat exchanger and said second heat exchanger, said first heat exchanger using heat generated by combustion of a gas mixture including hydrogen and oxygen to heat said inert gas, said first heat exchanger supplying steam resulting from the combustion to a high pressure intake of said first turbine, said second heat exchanger using heat from said inert gas of said first system to heat steam exhausted from a low temperature outlet of said first turbine, said second heat exchanger passing the heated steam to said third turbine.

2. A hydrogen-combustion gas turbine plant, as set forth in claim 1, further comprising a branch passage for receiving water exhausted from said condenser and a pump for pumping at least a portion of the water exhausted from said condenser to a low temperature side of said first heat exchanger.

3. A hydrogen-combustion gas turbine plant as set forth in claim 2, further comprising a cooler for cooling said inert gas of said first system, said cooler transferring heat from inert gas between said second heat exchanger and said compressor to water between said pump and said first heat exchanger.

4. A hydrogen-combustion gas turbine plant as set forth in claim 1, 2 or 3, further comprising a channel for directing at least a portion of steam exhausted from said first turbine to said second turbine to cool a portion of the second turbine, said channel returning the directed steam to an intake of said second heat exchanger.

5. A hydrogen-combustion gas turbine plant as set forth in claim 3, further comprising an oxygen dissolver between said pump and said cooler.

6. A hydrogen-combustion gas turbine plant as set forth in claim 2, further comprising an oxygen dissolver between said pump and said first heat exchanger.

* * * * *